United States Patent [19]

Bachmann

[11] Patent Number: 4,905,662

[45] Date of Patent: Mar. 6, 1990

[54] GUILLOTINE DAMPERS WITH BLADE SEALING MEANS ACCOMMODATIVE OF THERMAL EXPANSION FORCES

[75] Inventor: Lothar Bachmann, Auburn, Me.

[73] Assignee: Bachmann Corporate Services, Inc., Lewiston, Me.

[21] Appl. No.: 309,107

[22] Filed: Feb. 13, 1989

[51] Int. Cl.⁴ ............................................... F23N 3/00
[52] U.S. Cl. .................................. 126/285 A; 251/326
[58] Field of Search ....................... 251/326, 328, 329; 126/285 A, 285 R

[56] References Cited

U.S. PATENT DOCUMENTS 4,493,311 1/1985 Bachmann ........................... 126/285

Primary Examiner—Carroll B. Dority

[57] ABSTRACT

A guillotine damper has the framework surrounding a flow path provided with side and bottom guide sections. The blade has U-shaped channel sections extending along the top, bottom and sides thereof with its bottom and side sections dimensioned for sliding engagement with corresponding guide sections. The guide and channel sections are connected to the framework and blade, respectively, in a manner preventing their distortions by thermal expansion forces.

6 Claims, 6 Drawing Sheets

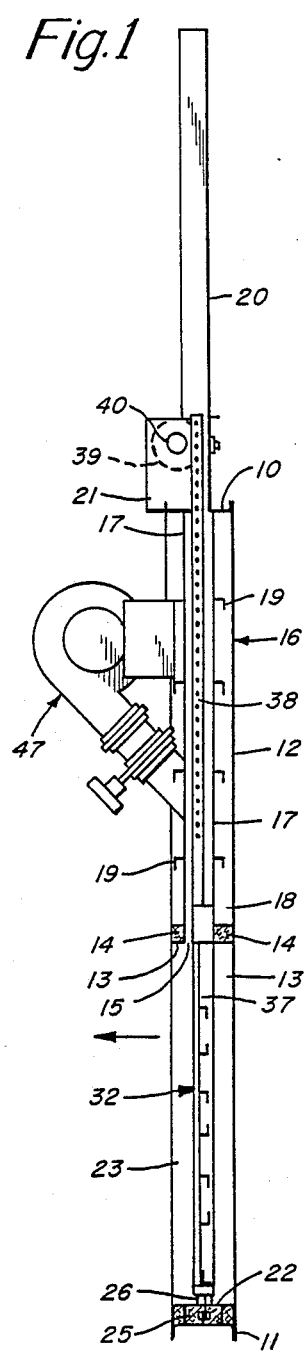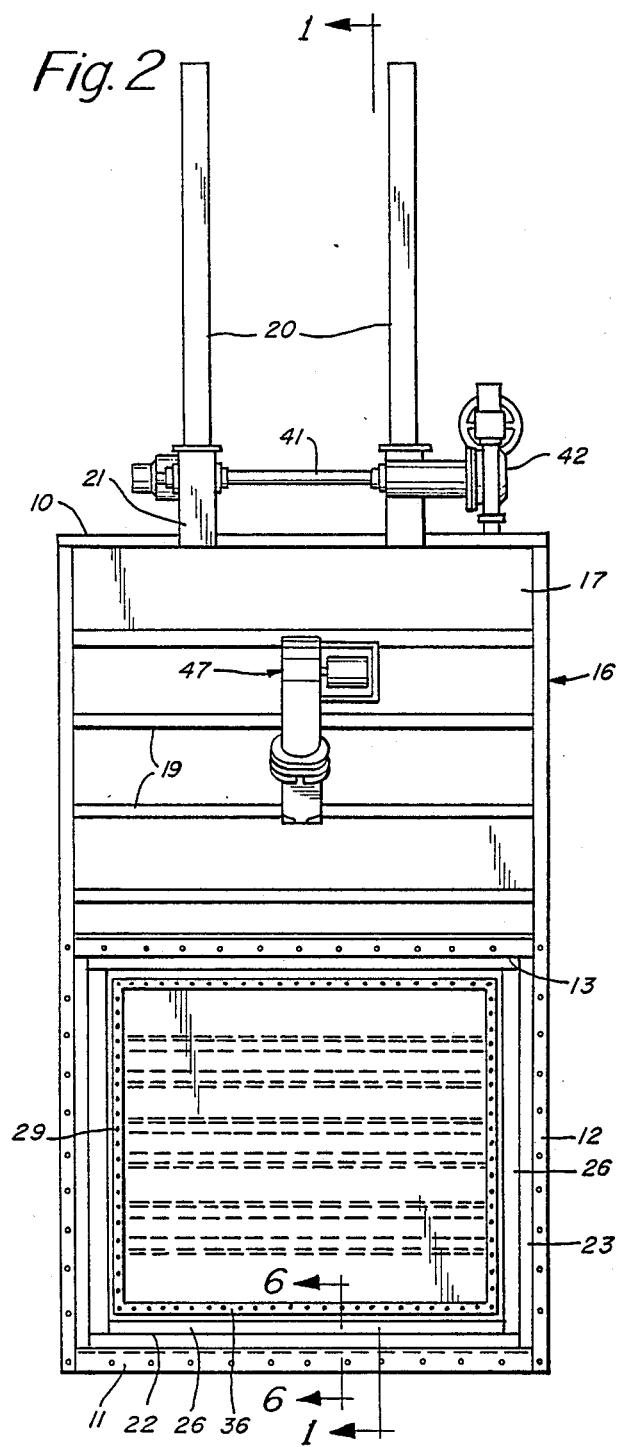

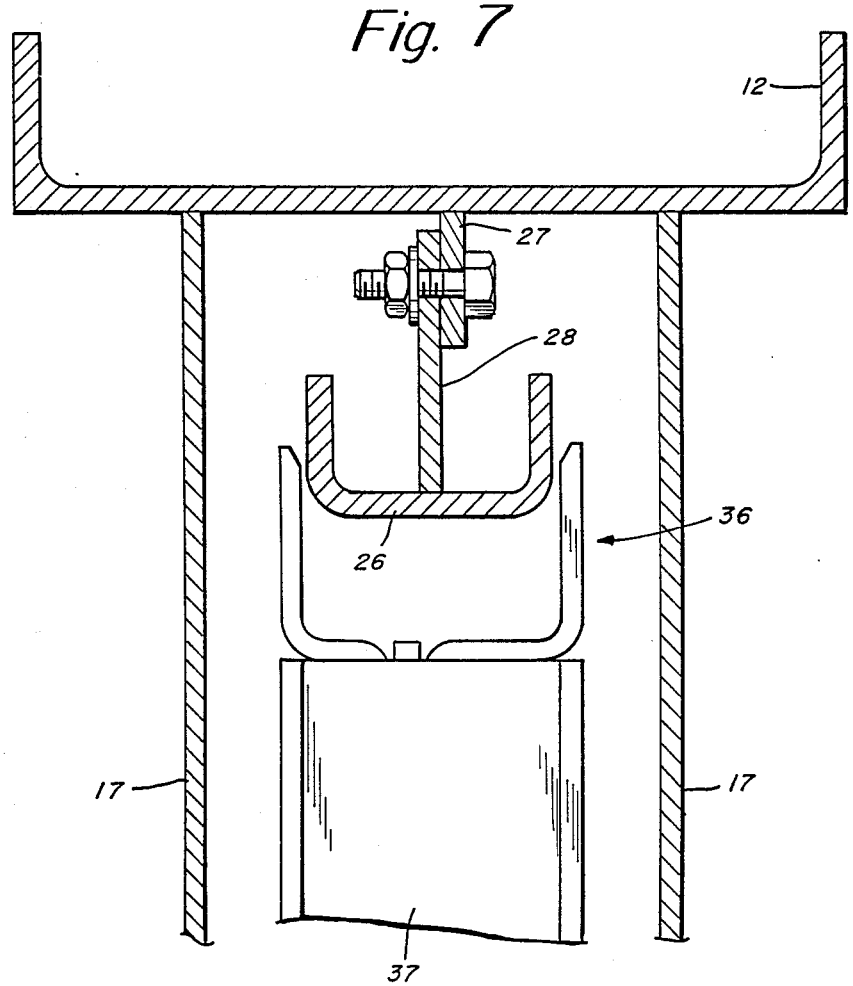

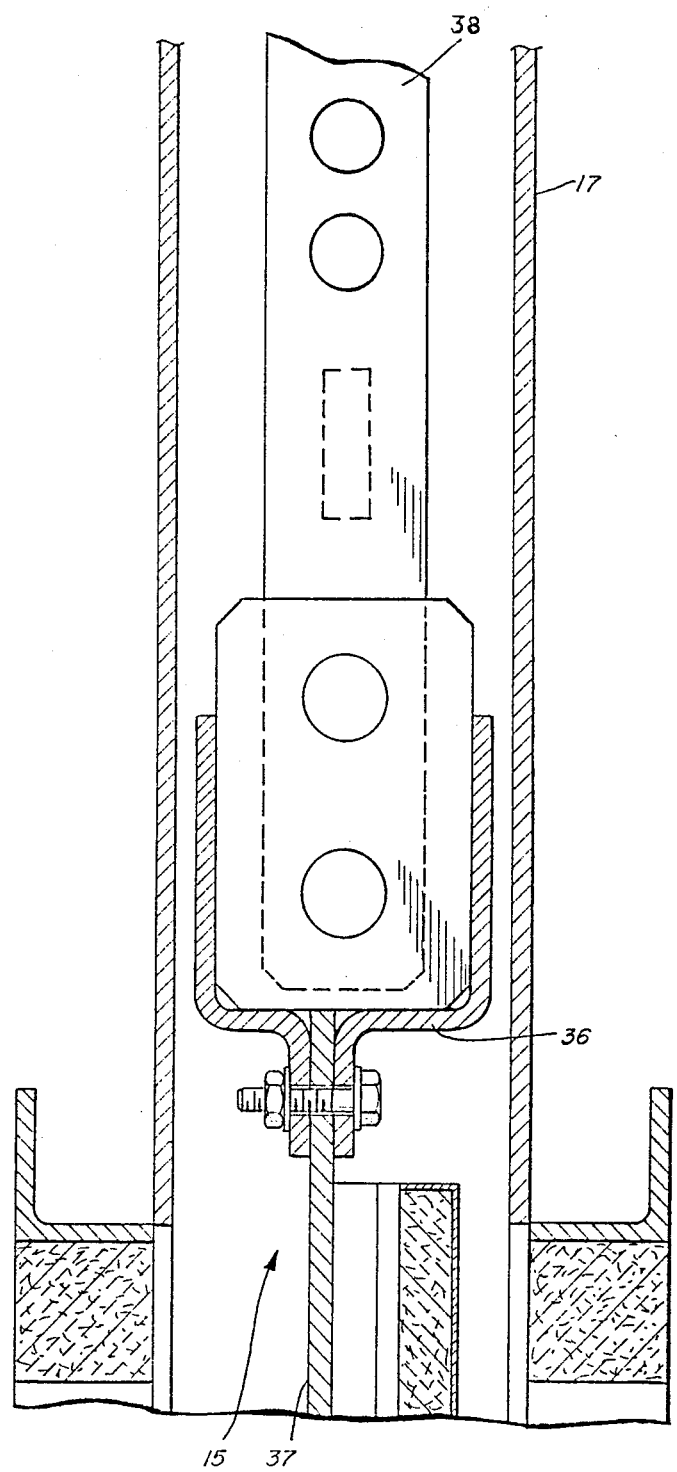

GUILLOTINE DAMPERS WITH BLADE SEALING MEANS ACCOMMODATIVE OF THERMAL EXPANSION FORCES

BACKGROUND OF THE INVENTION

The operation of gas turbines is attended by exhaust gas streams of large volumes and suddenly attained high temperatures which streams are well adapted for use in cogeneration.

A gas turbine exhaust system has, accordingly, a section including a heat recovering steam boiler and a bypass section. During cogeneration, the bypass section must be closed by the use of one or more dampers and when the steam boiler is to be placed out of service for any reason, the section leading thereto must also be closed by the use of one or more dampers. Dampers for use in such exhaust systems may be of either a louver type or a guillotine type but are herein discussed as of the latter type.

Because of the sudden build-up of high temperatures during the operation of gas turbines, it is essential that each such damper be so constructed that it will accommodate thermal expansion forces that would otherwise destroy the effectiveness of the means sealing the clearances between the damper blade and the framework by which it is supported.

THE PRESENT INVENTION

The general objective of the present invention is to provide guillotine dampers in which the sealing means are not distorted by thermal expansion forces.

Guillotine dampers have their blades vertically reciprocable between closed positions blocking the flow paths through the dampers and open positions in which they are housed within bonnets. In each such damper, the blade and the margins of the framework bordering the flow path are sealed in one way or another to render the damper fully effective.

In accordance with the present invention, the framework includes an outer frame, an inner frame spaced therefrom by insulation and a guide connected through the inner frame and the insulation to the outer frame with the connection of a type enabling thermal expansion forces exerted on the guide to be accommodated. The blade is bordered by a U-shaped channel connected thereto by means enabling distortion by thermal expansion forces exerted by the blade to be prevented. The sides and bottom sections of the channel are so dimensioned that the guide is a slidable fit therein as the blade is raised and lowered but with a space between the guide and the closed end of the channel useable as a conduit for sealing air. The top and bottom sections of the channel fit within the bonnet entrance.

Another aspect of the invention is that, in most installations, it is necessary both to reinforce and to insulate the upstream face of the blade. To enable the blade to be adequately reinforced and insulated, the channel is formed from upstream and downstream side portions between which the margins of the blade are held in a manner enabling thermal expansion forces to be accommodated and which are so shaped and dimensioned that, when secured to the blade, the plane of the blade is shifted downstream relative to the central plane of the channel to an extent such that the required thickness of insulation does not protrude upstream through a plane inclusive of the upstream sides of the channel.

Other objectives and novel features of the invention will be apparent from the accompanying specification and the appended claims.

BRIEF DESCRIPTION OF THE DRAWINGS

The accompanying drawings illustrate a preferred embodiment of a guillotine damper in accordance with the invention and FIG. 1 is a section taken approximately along the indicated line 1—1 of FIG. 2;

FIG. 2 is a view of the front or upstream face of the damper;

FIG. 7 is a section on an increase in scale, taken approximately along the indicated line 7—7 of FIG. 2; and FIG. 8 is a like section taken approximately along the indicated line 8—8 of FIG. 2.

THE PREFERRED EMBODIMENT OF THE INVENTION

Figures 3, 4:
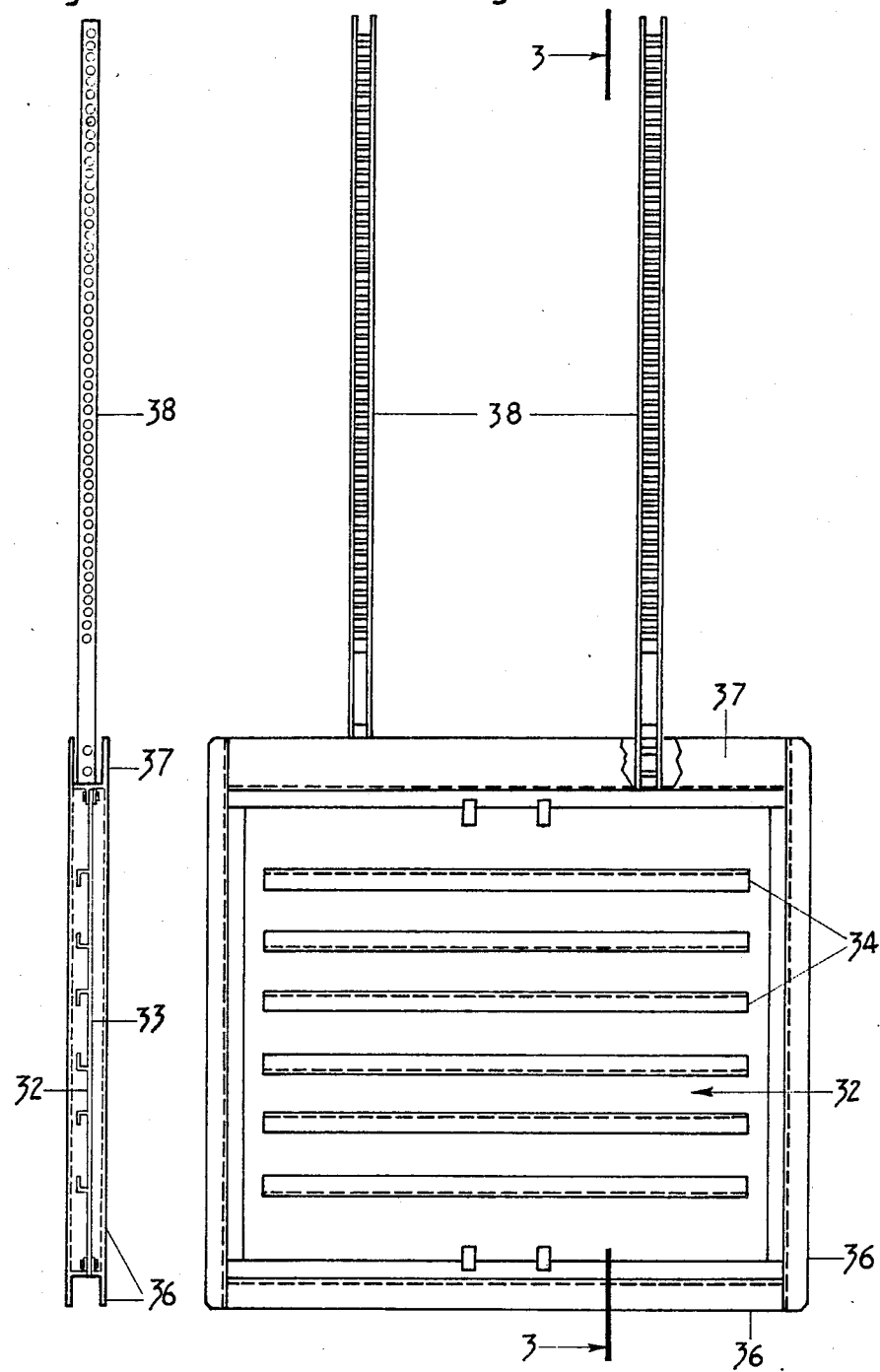
FIG. 3 is a section taken approximately along the indicated line 3—3 of FIG. 4.
FIG. 4 is a front view of the blade and the racks by which the blade is raised and lowered.

The guillotine damper illustrated by the drawings is of the type shown and described in U.S. Pat. No. 4,493,311. Framework to be incorporated in the exhaust system of a gas turbine includes a supporting frame having top, bottom and side members of channel stock indicated at 10, 11 and 12, respectively. The side members 12 are interconnected between their ends by a pair of spaced apart U-shaped members 13 filled with insulation 14 with the space between them constituting the entrance 15 of a bonnet, generally indicated at 16.

The bonnet 16 is formed by walls 17, lower ends 18 closing the members 13, their side edges welded to the side members 12 and their outer faces provided with reinforcements 19. The space between their upper ends is closed by the supporting frame member 10. A pair of tubular enclosures 20 each of which is connected to the interior of the bonnet 16 by housings 21 mounted on the frame member 10 and opening into the bonnet.

Figure 6:
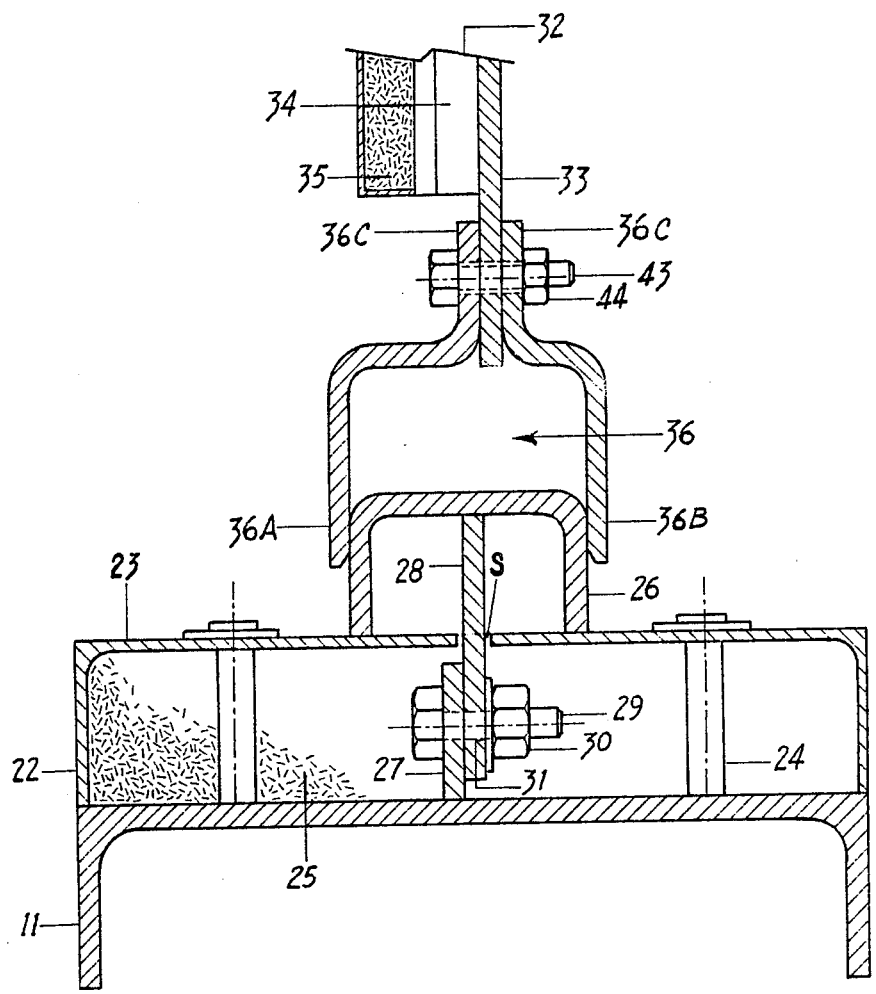
FIG. 6 is a section, on an increase in scale, taken approximately along the indicated lines 6—6 of FIG. 2.

In accordance with the present invention, the framework includes an inner stainless steel frame which has U-shaped bottom and side sections 22 and 23, desirably of stainless steel, secured to the corresponding members of the supporting frame by insulated connectors 24, see FIG. 6. The space bordered by the sections 22 and 23 and the corresponding members 11 and 12 is filled with insulation 25. The inner frame section and the members 13 establish a rectangular passageway to permit the hot exhaust gas to pass through the damper, the direction of the hot gas stream being indicated by the arrow in FIG. 1.

Each of the inner frame sections has an inverted U-shaped guide 26 extending lengthwise and centrally thereof. A series of connections join each guide to the corresponding member of the supporting frame. One such connection is shown in FIG. 6 with a mount or first member 27 welded to the member 11 and a holder or second member 28 welded to the interior of the closed end of the guide and extending through a slot 8 in the closed end of the associated section of the inner frame. The mount 27 and the holder 28 have bolt holes through which a bolt 29 extends with the mount and holder held together when a nut 30 is threaded on the bolt 29 against a washer. The bolt hole 31 in the holder 28 is oversized to prevent thermal expansion forces from distorting the guides.

The blade of the damper is generally indicated at 32 and is shaped and dimensioned to block flow through the passageway and the bonnet 16 is dimensioned to accommodate the blade when flow through the damper is wanted. The blade 32 includes a relatively thin steel plate or membrane 33 provided with stiffeners or reinforcements 34 on its upstream face which are conventionally shielded by a clad body of insulation 35, see FIG. 6. In accordance with the invention, the blade 32 has a channel, generally indicated at 36, the sides and bottom sections of which are shaped and dimensioned to slide along and over corresponding guide sections to establish therewith a gas flow barrier with an air space between the guide and channel sections. The blade 32 also is provided with a channel 37 extending transversely of its upper end and is dimensioned for entry in the bonnet entrance 15.

The thickness of the blade 32 including its channel sections and the insulation is such that the blade may pass through the bonnet entrance 15. To enable the blade 32 to be raised and lowered, it is provided with racks 38 which extend vertically through the housing 21 and into the rack enclosures 20 which are dimensioned to accommodate the racks when the blade 32 is so lifted as to be housed within the bonnet 16. In each housing 21 there is a pinion 39 both of which are fixed on a shaft 40 rotatably supported by the housing 21 and sealed within a tubular housing 41 and connected to a sealed, reversible drive 42.

In order to avoid the distortion of the channel 36 and 37 by thermal expansion forces when the blade 32 is subjected to the high temperature exhaust gases, the channel 36 is constructed and connected to the margins of the blade membrane 33 in a manner preventing such forces from distorting the sections of the channel 36. Reference is made to FIG. 6 wherein the bottom section of the channel 36 is shown as consisting of upstream and downstream sections 36A and 36B, respectively, each of which has a sidewall and an end wall disposed towards the other section and terminating in a flange 36C extending the full length thereof. The flanges 36C are interconnected through the margins of the membrane 33 by bolts 43 provided with washers extending through a series of holes 44 and 44A extending lengthwise of each of the flanges 36C and a corresponding series of holes 45 and 45A extending lengthwise of each of the margins of the blade membrane 33. Each of the bolts 43 is anchored by a nut 46.

It will be noted that the end walls of the sections 36A and 36B need not be and are shown as not of the same width. With the end wall of the section 36A wider than that of the section 36B, the membrane 33 is positioned sufficiently downstream to enable the thickness of the insulation to be increased as required without protruding upstream beyond the plane of the sidewalls of the sections 36A.

Figure 5:
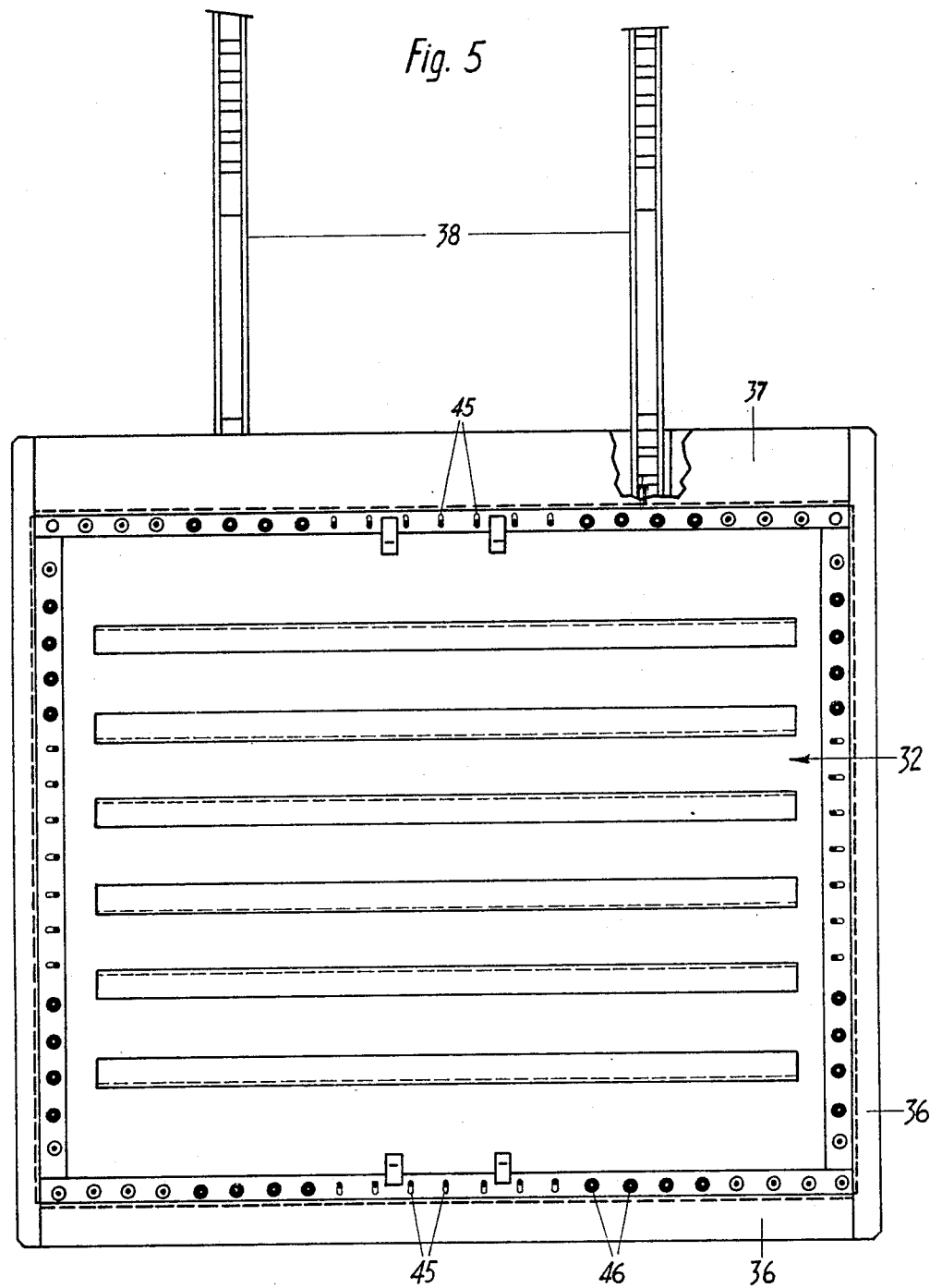
FIG. 5 is a view similar to FIG. 4 but on a further increase in scale.

The holes 44 and 44A in the flanges of the sections 39A and 39B, see FIG. 5, are especially dimensioned with the holes 44 centrally of corresponding sections of the channels 36 and 37 shown as slots permitting membrane expansions to occur in a direction normal to the appropriate margin thereof while the other holes 44A are somewhat oversized to permit expansion in any planar directions. This hole arrangement is similar to that disclosed in copending application, Ser. No. 055,594, now U.S. Pat. No. 4,821,507, in protecting a diverter blade from being distorted.

From the foregoing, it is apparent that the invention provides means for effectively preventing distortions of both the blade guides and the sections of the blade channels that are in slidable engagement therewith during use.

The damper disclosed and described herein does not have its blade mechanically sealed since it is assumed that the damper is to be normally open and closed only for short, infrequent intervals. When the damper is closed, it is air sealed against leakage for which purpose a blower 47, mounted on the bonnet 16, discharges air into the bonnet and into the space between the closed ends of the guide sections and the closed ends of corresponding sections of the blade channels.

I claim:

1. A guillotine damper to be incorporated in the exhaust system of a gas turbine, said damper including framework provided with a supporting frame having upper, side and bottom portions and an inner frame having side and bottom portions which are U-shaped in cross section, a pair of laterally spaced, internally insulated transverse members connected to the framework and dividing the framework into an upper bonnet and a lower rectangular gas flow passageway with the space between the members constituting the bonnet entrance, thermal insulation between the frames, a guide in a plane inclusive of the space between the members and having side and bottom sections seated against the corresponding sections of the inner frame, means connecting the guide sections to the supporting frame through the corresponding inner frame sections and the insulation therein in a manner preventing thermal expansion forces from distorting the guide, and a rectangular blade dimensioned to close the passageway and to pass through the bonnet entrance for storage in the bonnet when the passageway is to be open, means connected to the blade and mounted on the bonnet and operable to lift the blade into the bonnet and to lower the blade from the bonnet into a position closing the passageway, said blade including a marginal frame consisting of upper, side and bottom sections provided with channels, the channels of the side sections in sliding contact with the side sections of the guide, the channel of the bottom section fitting over the bottom section of the guide as the blade reaches its closed position, and the channel of the upper section dimensioned then to be within the bonnet entrance, the sections of the marginal blade frame connected to the blade in a manner preventing the distortion of the channels thereof by thermal expansion forces.

2. The guillotine damper of claim 1 in which the guide sections are U-shaped in cross section, the inner frame has slots extending lengthwise of its sections, the means connecting the guide to the outer frame includes first members in the forms of mounts spaced lengthwise of the bottom and sides of the supporting frame and a series of second members in the form of holders spaced lengthwise of each guide section and welded to the interior thereof, each second member of a length such that with the edges of the guide section seated against the inner frame, each second member extends through a slot thereof into connecting proximity to an appropriate first member, at least one of the members having a hole, and a threaded connection joining the members extends through the hole which is oversized with respect to the threaded member.

3. The guillotine damper of claim 2 in which thermal insulators connect the section of the inner frame to corresponding portions of the supporting frame.

4. The guillotine damper of claim 1 in which at least the blade frame has a series of holes spaced lengthwise of each section, the means connecting the blade frame to the margins of the blade consist of a series of threaded connectors, each extending through the appropriate one of the holes, said connectors join the frame sections to the blade, the holes dimensioned relative to the connectors to permit relative movement between the frame and the margins of the blade to occur in at least one direction in the plane of the blade in response to thermal expansion forces.

5. The guillotine damper of claim 4 in which the sections of the blade frame consist of upstream and downstream sections each of which has a side and an end wall, the end wall disposed towards the other blade frame section, and provided with an end flange, the margins of the blade and the end flanges have a series of lengthwise holes corresponding ones of which are aligned, threaded connectors extend through the aligned holes with the blade margins between the frame flanges and secure the frame sections to the blade, and at least the holes in the flanges dimensioned relative to the threaded connectors to permit relative movement between the frame sections and the margins of the blade in at least one direction in the plane of the blade in response to thermal expansion forces.

6. The guillotine damper of claim 5 and a body of insulation fixed on the upstream face of the blade and of a thickness greater than one-half the width of the channels of the frame sections, the width of the end of the upstream frame section greater than the width of the end of the downstream frame section thereby placing the plane of the blade downstream from a plane inclusive of the centers of the channels of the frame sections to an extent such that the body of insulation does not protrude through the plane established by the side walls of the frame sections.

* * * * *